(12) United States Patent
Gains et al.

(10) Patent No.: US 7,523,058 B2
(45) Date of Patent: Apr. 21, 2009

(54) SYSTEMS AND METHODS FOR PROCESSING NEGOTIABLE INSTRUMENTS

(75) Inventors: Cathy Gains, Littleton, CO (US); Kathy Lawless, Parker, CO (US); Robin Heller, Highlands Ranch, CO (US); Jeanne Custy, Parker, CO (US)

(73) Assignee: Integrated Payment Systems Inc., Englewood, CO (US)

( * ) Notice: Subject to any disclaimer, the term of this patent is extended or adjusted under 35 U.S.C. 154(b) by 1162 days.

(21) Appl. No.: 10/410,519

(22) Filed: Apr. 7, 2003

(65) Prior Publication Data

US 2004/0210523 A1 Oct. 21, 2004

(51) Int. Cl.
*G06Q 40/00* (2006.01)
(52) U.S. Cl. ...................... 705/36 R; 705/30
(58) Field of Classification Search .............. 705/10–44
See application file for complete search history.

(56) References Cited

U.S. PATENT DOCUMENTS 5,940,844 A * 8/1999 Cahill et al. ................ 715/526

OTHER PUBLICATIONS

Velri, et al. "Payments", Business Layer, v57n4 pp. 1699-1723, Aug. 2002, ISSN: 0007-6899, Journal code : BLW, Dialog file 15, Accession No. 02510176.*

* cited by examiner

*Primary Examiner*—Frantzy Poinvil
(74) *Attorney, Agent, or Firm*—Townsend and Townsend and Crew LLP

(57) ABSTRACT

A method of processing negotiable instruments includes receiving a message at a host computer system of an entity that processes negotiable instruments from a client computer of an entity that issues negotiable instruments. The message comprises a request to receive a list of negotiable instruments paid by the processor and issued by the issuer. The method also includes transmitting a file from the host computer system to the client computer. The file includes the list at least one selection arrangement for at least one item in the list. The at least one selection arrangement is programmed to receive information from the issuer relating to issue information for the at least one item. The method also includes receiving at the host computer system issue information relating to one of the items in response to a selection using one of the at least one selection arrangements.

3 Claims, 10 Drawing Sheets

Paid Unadvised Workbench

Inst: 100011  RON: 100004  Client: Type: Both  Sort Order: Client  Wire Date: 01/28/2003

| View | Client # | Serial # | Amount | Type | Paid Date | Issue All<br>Issue | Previously<br>Reported | Serial #<br>Change | Reset<br>No Action |
|---|---|---|---|---|---|---|---|---|---|
| 📷 | 000342 | 003275872 | $646.53 | OC | 01/28/2003 | ○ | ○ | ○ | ⊙ |
| 📷 | 000342 | 003834668 | $38.34 | OC | 01/28/2003 | ○ | ○ | ○ | ⊙ |
| 📷 | 000342 | 004138084 | $55.18 | OC | 01/28/2003 | ○ | ○ | ○ | ⊙ |
| 📷 | 000342 | 004155451 | $845.32 | OC | 01/28/2003 | ○ | ○ | ○ | ⊙ |
| 📷 | 000342 | 004354846 | $387.20 | OC | 01/28/2003 | ○ | ○ | ○ | ⊙ |

☐ Check to continue working with remaining PUAs

[Submit]  [Save]  [Cancel]

* PUA items designated as "Previously Reported" are saved and remain available to be worked.

FIG. 5

| View | Client # | Serial # | Amount | Type | Paid Date | Reserved By | Status | Worked By | Wire Date |
|---|---|---|---|---|---|---|---|---|---|
| 📷 | 000342 | 003275872 | $646.53 | OC | 01/28/2003 | -- | Submitted PUA Issue | DJG | 1/28/2003 |
| 📷 | 000342 | 003834668 | $38.34 | OC | 01/28/2003 | -- | Submitted PUA Issue | DJG | 1/28/2003 |
| 📷 | 000342 | 004138084 | $55.18 | OC | 01/28/2003 | -- | Submitted PUA Issue | DJG | 1/28/2003 |
| 📷 | 000342 | 004155451 | $845.32 | OC | 01/28/2003 | -- | Submitted PUA Issue | DJG | 1/28/2003 |
| 📷 | 000342 | 004354846 | $387.20 | OC | 01/28/2003 | -- | Submitted PUA Issue | DJG | 1/28/2003 |
| 📷 | 000342 | 004800153 | $383.85 | OC | 01/28/2003 | -- | Submitted PUA Issue | OfficialCK | 1/28/2003 |
| 📷 | 000342 | 074402655 | $875.58 | OC | 01/28/2003 | -- | Workable | DJG | 1/28/2003 |
| 📷 | 000342 | 010081300 | $810.67 | OC | 01/28/2003 | -- | Workable | DJG | 1/28/2003 |
| 📷 | 000342 | 010524876 | $105.24 | OC | 01/28/2003 | -- | Workable | DJG | 1/28/2003 |
| 📷 | 000342 | 0171113838 | $368.20 | OC | 01/28/2003 | -- | Submitted PUA Issue | OfficialCK | 1/28/2003 |
| 📷 | 000342 | 020148122 | $555.13 | OC | 01/28/2003 | -- | Workable | DJG | 1/28/2003 |
| 📷 | 000342 | 020368678 | $557.34 | OC | 01/28/2003 | -- | Workable | OfficialCK | 1/28/2003 |
| 📷 | 000342 | 022461881 | $578.36 | OC | 01/28/2003 | -- | Workable | OfficialCK | 1/28/2003 |

FIG. 9

SYSTEMS AND METHODS FOR PROCESSING NEGOTIABLE INSTRUMENTS

BACKGROUND OF THE INVENTION

This application relates generally to negotiable instruments. More specifically, this application relates to methods and systems for processing official checks, money orders, and other negotiable instruments.

There are numerous applications in which customers wish to purchase negotiable instruments that are backed by guaranteed funds. Such negotiable instruments are much like other negotiable instruments except that their backing is provided by a recognized entity that guarantees the availability of the funds on behalf of the customers. They are, therefore, typically used by consumers as part of relatively large transactions, such as for providing a down payment on the purchase of a house or automobile, but also may be used in other contexts as well. Examples of negotiable instruments whose terms are backed in this way include "certified checks," which are checks drawn on the customer's account but with those funds earmarked for that particular check by a financial institution; "cashier's checks" and "money orders," each of which are checks drawn on the financial institution itself, and thereby backed by the financial institution; "teller's checks," which are checks drawn by the financial institution on another financial institution; and "traveler's checks," which are a type of instrument drawn on the financial institution, like a cashier's check or money order, but requiring a countersignature by the customer.

The issuance and processing of negotiable instruments by various financial institutions creates a complexity to the system that it is desirable to simplify. This complexity may manifest itself in a variety of different ways, including in procedures that require coordination for clearing and settlement of the instruments when they are negotiated. In addition, some financial institutions, particularly smaller financial institutions, may wish to provide the service of selling negotiable instruments to customers, but do not wish to assume the obligation of providing the backing for those instruments. There are, accordingly, advantages that may result from improved methods and systems for processing negotiable instruments.

BRIEF SUMMARY OF THE INVENTION

Embodiments of the present invention thus provide a method of processing negotiable instruments. The method includes receiving a message at a host computer system of an entity that processes negotiable instruments from a client computer of an entity that issues negotiable instruments. The message comprises a request to receive a list of negotiable instruments paid by the processor and issued by the issuer. The method also includes transmitting a file from the host computer system to the client computer. The file includes the list at least one selection arrangement for at least one item in the list. The at least one selection arrangement is programmed to receive information from the issuer relating to issue information for the at least one item. The method also includes receiving at the host computer system issue information relating to one of the items in response to a selection using one of the at least one selection arrangements. The issue information relating to one of the items may include a selection that indicates that the issuer previously reported the issue information to the processor. The method also may include transmitting from the host computer system to the client computer a file that includes selection arrangements programmed to receive additional issue information relating to the one of the items and receiving the additional issue information at the host computer system. The method of claim 3, wherein receiving the additional issue information comprises receiving a date upon which the issuer previously reported the item and an amount relating to the item. The issue information relating to one of the items may include a selection that indicates that the issuer previously reported the issue information to the processor using a different serial number. Receiving the additional issue information at the host computer system may include receiving the different serial number used to previously report the item. Receiving issue information relating to one of the items may include receiving an instruction to issue the item. The method also may include receiving a request to view an image of the item and transmitting a file comprising an image of the item.

In some embodiments, a system for processing negotiable instruments includes a host computer system and software that programs the host computer system. The software programs the host computer system to receive a request to receive a list of negotiable instruments paid by a processor and issued by a issuer from a client computer. The software also programs the host computer system to transmit a file from the host computer system to the client computer. The file includes the list and at least one selection arrangement for at least one item in the list. The at least one selection arrangement is programmed to receive information from the issuer relating to issue information for the at least one item. The software also programs the host computer system to receive at the host computer system issue information relating to one of the items. The issue information relating to one of the items may include a selection that indicates that the issuer previously reported the issue information to the processor. The software also may program the host computer system to transmit from the host computer system to the client computer a file comprising selection arrangements programmed to receive additional issue information relating to the one of the items and receive the additional issue information at the host computer system. The software also may program the host computer system to receive a date upon which the issuer previously reported the item and an amount relating to the item. The issue information relating to one of the items may include a selection that indicates that the issuer previously reported the issue information to the processor using a different serial number. The software also may program the host computer system to receive an instruction to issue the item. The software also may program the host computer system to receive a request to view an image of the item and transmit a file comprising an image of the item to the client computer.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

FIG. 5 illustrates a PUA workbench screen according to embodiments of the present invention.

FIG. 9 illustrates a PUA view screen according to embodiments of the present invention.

DETAILED DESCRIPTION OF THE INVENTION

Figure 1:
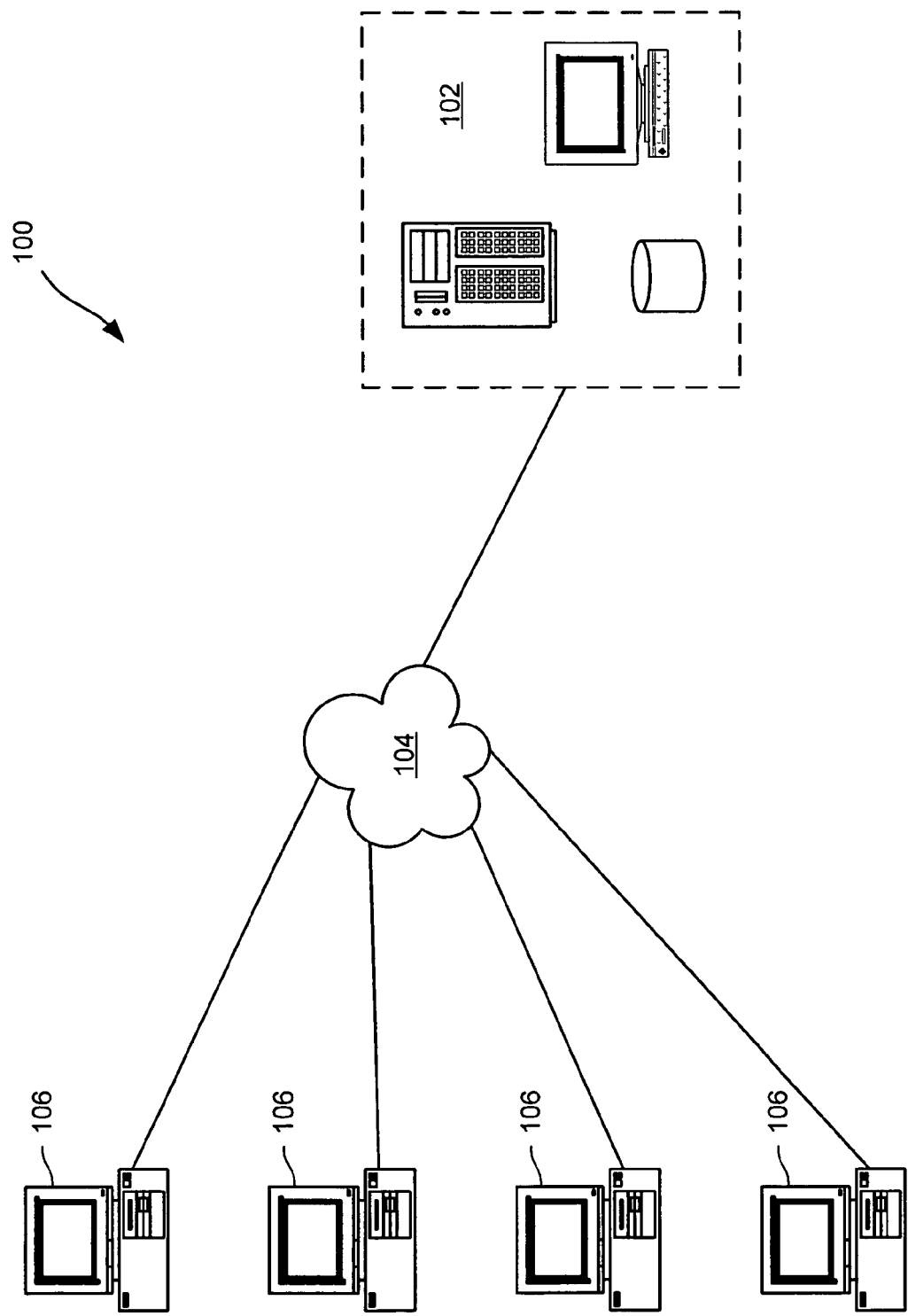
FIG. 1 illustrates a system for processing negotiable instruments according to embodiments of the present invention.

According to the present invention, a vendor that backs and processes negotiable instruments provides an interactive system whereby its clients may obtain and provide information necessary for the processing of the negotiable instruments. The present invention will be described in the context of official check processing. It should be understood, however, that the present invention is not limited to official checks. The processing of other negotiable instruments also may benefit from the teachings of the present invention.

The vendor (hereinafter "the backer") that backs and processes official checks does so on behalf of clients, such as banks, credit unions, and the like, that wish to offer official checks to their customers. When a client issues an official check, it receives money from the customer and presents the customer with the instrument. The client/issuer transfers money to the backer along with information needed by the backer to process the official check. Such information may include the serial number of the official check, its amount, the date it was issued, and the like. The customer then may present the official check to a merchant or other entity who typically will deposit it. Eventually, the backer is called upon to provide the funds to the recipient of the check.

The information necessary to process official checks may be provided by the client to the backer in a number of ways. In one embodiment of the present invention, clients may access and provide information about official checks by logging on to a web site of the backer. The web site may include security features that prevent unauthorized access or control to what information a particular client has access. Using such a system, a client may access reports relating to the client's official checks, correct inaccuracies, resolve disputes, provide information on new issues, and the like.

Is some instances, a backer may be called upon to provide the funds for an official check that the backer is not aware has been issued. In the interest of maintaining the integrity of a system that counts on the availability of funds backing official checks, the backer typically will pay the recipient. The official check then becomes categorized, according to some backers, as "paid unadvised" (PUA). The backer then will contact the client that issued the PUA official check and request resolution.

Official checks may become PUAs for various reasons. For example, the client may not have had time to provide the information to the backer before the customer uses the official check in a transaction and the merchant presents it for payment. It could be that case that the serial number of the official check was incorrectly entered by either the client or the backer, depending upon how the data is processed. Many other examples are possible.

According to the present invention, upon the occurrence of a PUA, the issuer accesses the backer's web site and requests information relating to the PUA and any other PUA official checks the issuer may have issued. Using a feature of the web site, the issuer may provide the information necessary to issue the PUA official check and/or direct the backer to where the information was provided previously. The process will be explained in more detail hereinafter.

Having described the present invention generally, attention is directed to FIG. 1, which illustrates a system 100 according to the present invention. As will be explained in more detail hereinafter, the system 100 may be used to process certified negotiable instruments of various types, including certified checks, cashier's checks, teller's checks, money orders, traveler's checks, official checks, and the like. It should be understood that, although the examples used herein relate to official checks, this is not a requirement. Other types of instruments may benefit from the teachings herein, as is apparent to those skilled in the art in light of this disclosure. Further, the system 100 of FIG. 1 should not be considered limiting. Those skilled in the art will realize equivalent arrangements in like of the disclosure herein.

The system 100 includes a host computer system 102. The host computer system 102 may include, for example, server computers, personal computers, workstations, web servers, and/or other suitable computing devices. The host computer system 102 includes application software that programs the host computer system 102 to perform one or more functions according to the present invention. For example, application software resident on the host computer system 102 may program the host computer system 102 to receive and process records of certified negotiable instruments. The host computer system 102 may include one or more of the aforementioned computing devices, as well as storage devices such as databases, disk drives, optical drives, and the like. The storage device may include solid state memory, such as RAM, ROM, PROM, and the like, magnetic memory, such as disc drives, tape storage, and the like, and/or optical memory, such as DVD. The host computer system 102 may be fully located within a single facility or distributed geographically, in which case a network may be used to integrate the host computer system 102. Many other examples are possible and apparent to those skilled in the art in light of this disclosure.

In a specific embodiment, the host computer system includes a mainframe that processes negotiable instruments, such as official checks, but does not provide direct access for clients, as will be described below. Instead, the mainframe sends a file comprising information on PUA instruments to a server computer within the host computer system that provides an interactive platform through which clients may resolve PUA issues. Once the clients have provided information to resolve and PUAs, the server sends the updated information to the mainframe or a data storage arrangement associated with the mainframe. If the mainframe receives information via other channels in the normal course of business after having provided information to the server, the mainframe may send updated information to the server or otherwise flag the items for which additional information has been received, thus preventing the client from providing duplicate, and possibly conflicting information. For example, in response to receiving updated information from the mainframe, the server may "lock" the records associated with the items so that the client cannot provide additional information.

The system 100 also includes a communication network 104. The network 104 may be the Internet, an intranet, a wide area network (WAN), a local area network (LAN), a virtual private network, any combination of the foregoing, or the like. The network 104 may include both wired and wireless connections, including optical links. In some embodiments, the network 104 is a financial services network. Through the network 104, client computers 106 communicate with the host computer system 102.

The client computers 106 may be any device capable of interacting with the host computer system 102 through a communication link, such as the network 104. For example, the client computers 106 may be personal computers, workstations, servers, and/or the like. Through the network, the client computers 106 access web pages at the host computer system 102. The web pages allow users at the client computers to view information or provide information for the processing of official checks. For example, as will be described in more detail below, the users are able to provide information necessary for issuing PUA official checks.

Figure 2:
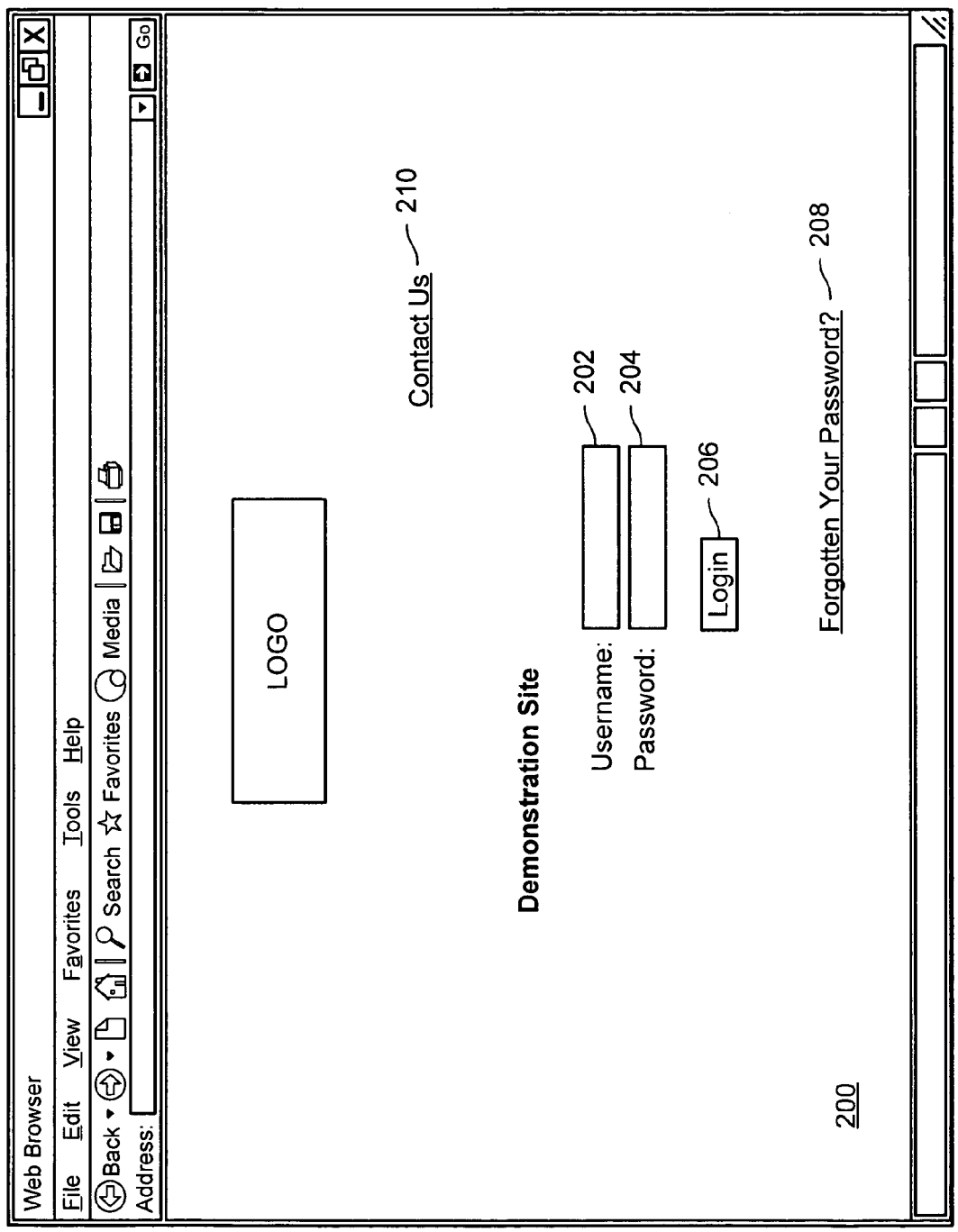
FIG. 2 illustrates a display screen for receiving username and password information from an issuer of negotiable instruments prior to obtaining access to information in the host computer system of FIG. 1.

Attention is directed to FIG. 2, which illustrates a first display screen 200 in an official check processing system. The display screen 200, as well as other display screens described herein, may be presented to a user in a standard web browser, as is known in the art. The display screen 200 includes a username field 202 and a password field 204 for receiving information relating to the client accessing the system. The login button 206 begins the process of verifying the users identity and authorization to access the system. The identify may be used to determine what information the user may access. Other helpful features also may be provided, such as a password reminder hyperlink 208, and an email hyperlink 210.

Figure 3:
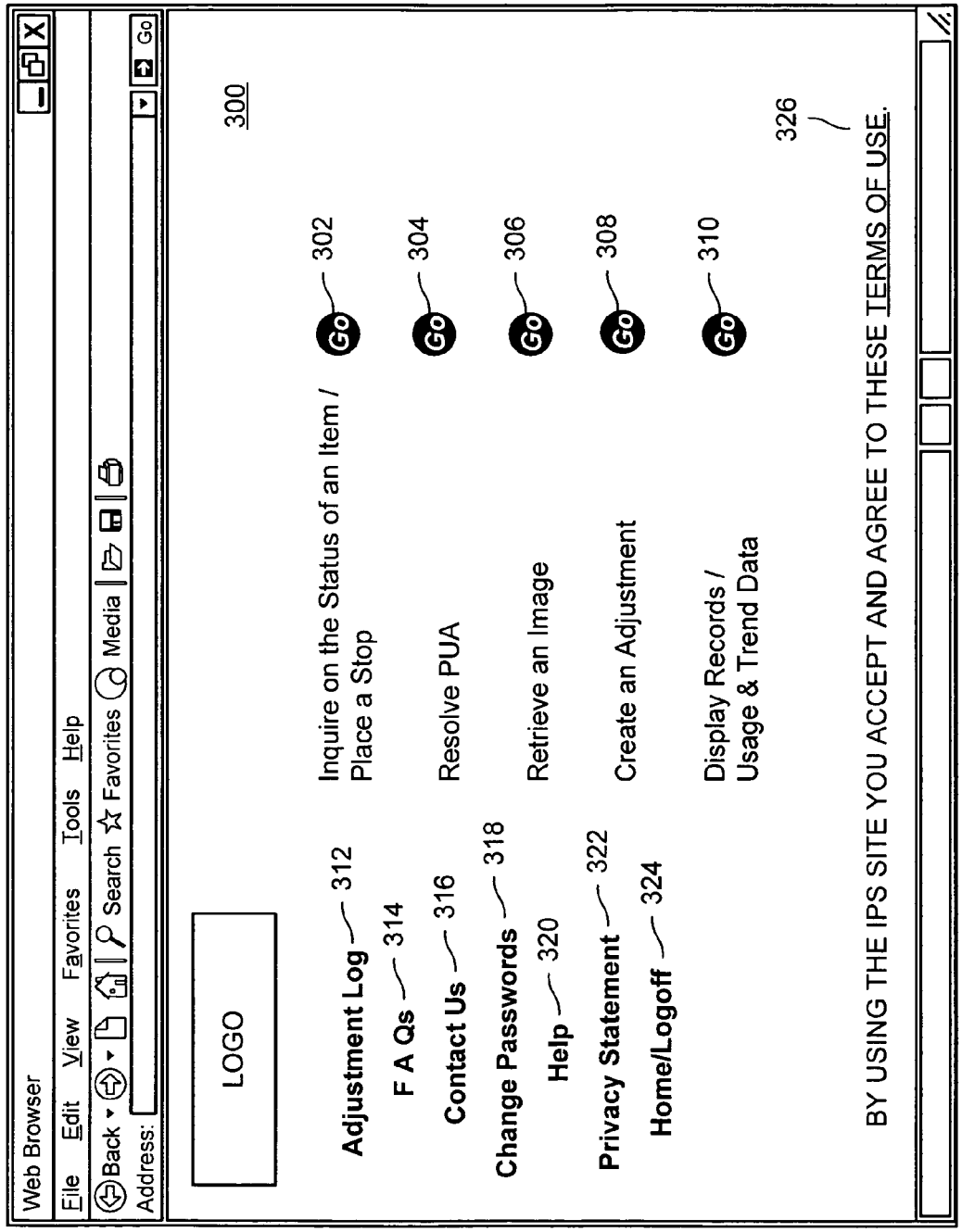
FIG. 3 illustrates a menu display screen for selecting various options provided by the system of FIG. 1.
Figure 4:
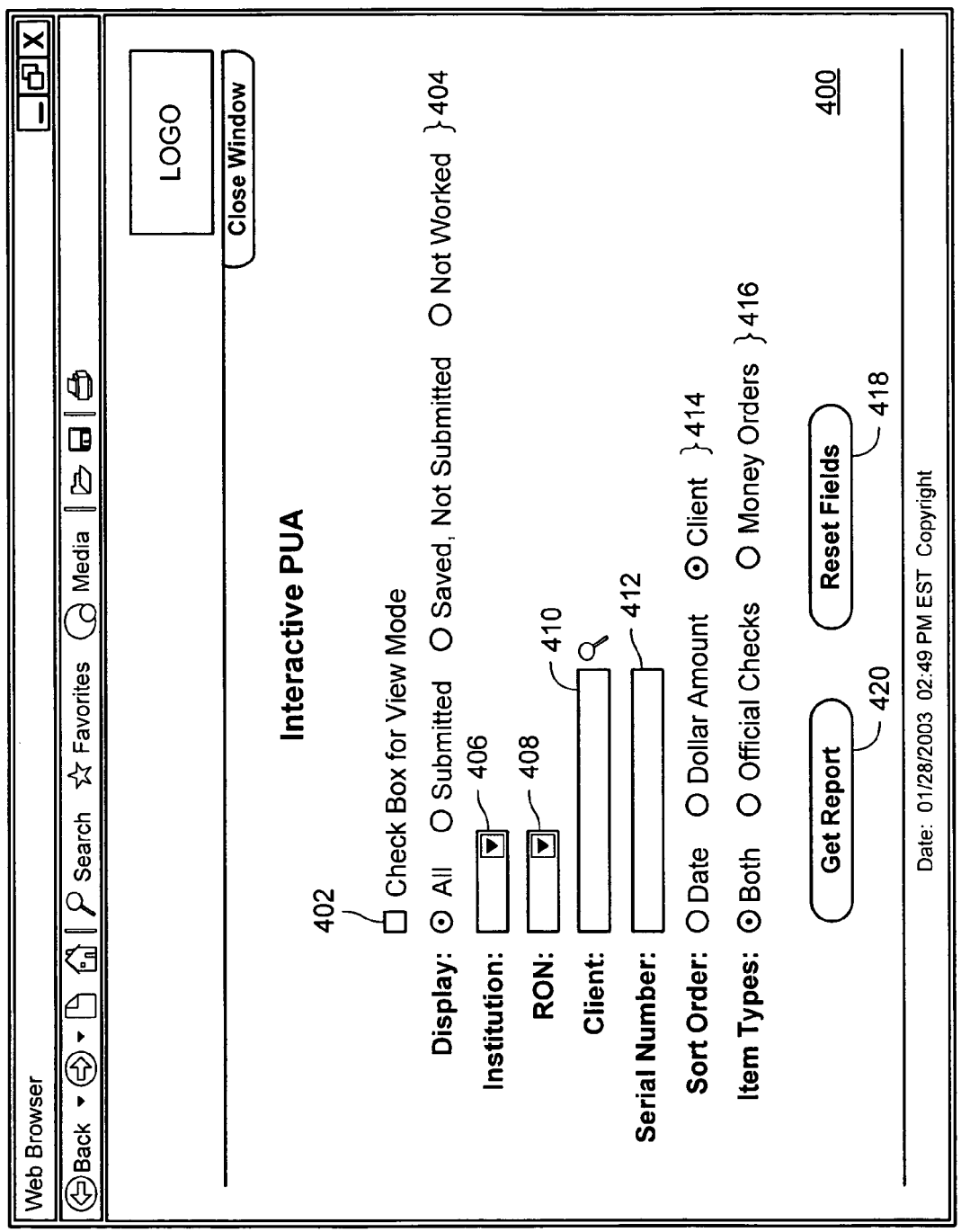
FIG. 4 illustrates a PUA interactive parameter selection screen according to embodiments of the present invention.

FIG. 3 illustrates a menu display screen 300. The menu display screen includes buttons that initiate the various function of the present invention. For example, the menu display screen 300 includes a status button 302 that allows a client to obtain information about an item or to stop payment on it; a PUA button 304 that allows the client to access the client's PUAs; an image button 306 that allows the client to see an image of an instrument; an adjustment button 308 that allows the client to access and/or provide information relating to official checks; and a reports button 310 that provides access to reports. Additionally, the menu display screen 300 includes hyperlinks for accessing an adjustment log 312, accessing a FAQ 314, sending an email to the backer 316, changing a password 318, obtaining help 320, accessing the privacy statement 322, logging off 324, and accessing terms of use 326. Selecting the PUA button 308 displays the PUA interactive parameter selection screen 400 of FIG. 4.

The PUA interactive parameter selection screen 400 allows a client to access its PUAs. The PUAs may be accessed in either of two modes, a view mode and a work mode. In the view mode, all current PUAs, including those in work, may be viewed. In work mode, the client may access the PUAs and resolve issues on one display screen, as will be described. For clients with large volumes of official checks—and thereby possibly large volumes of PUAs—the use of a work mode and a view mode allows different workers to simultaneously work on different segments of PUAs in the work mode, while another worker, such as a supervisor, can oversee the work of the workers in the view mode. A check box 402 is used to designate which of the two modes the user desires.

The PUA work screen 400 includes various fields, radio buttons, and drop-down menus for segmenting and specifying PUAs to be displayed. For example, the display radio button set 404 allows the user to designate all PUAs, only those submitted, those saved but not submitted, and those not worked. The institution drop-down menu 406, RON drop-down menu 408, and the client field 410 all the user to specify PUAs by organization hierarchy. The serial number field 412 allows the user to specify a specific serial number to view. The sort radio button set 414 allows the client to specify the sort order, which may be date, dollar amount, or client. The item types radio button set 416 allows the client to specify the display of either official checks only, money orders only, or both. A reset fields button 418 sets all selections to default values, while a get report button 420 lists the specified PUAs in a display screen such as the PUA workbench screen 500 of FIG. 5.

The PUA workbench screen 500 is a work mode screen that provides an interactive screen whereby clients may view PUAs and provide information necessary to resolve them. The screen 500 includes an information area 502 that informs the client which account hierarchy was selected in the PUA parameter selection screen 400. A wire date field 504 allows the client to switch to PUAs of other dates. The buttons in the view column 506 allow the client to obtain an image of the PUA in the row. One example of a view screen 600 is provided in FIG. 6.

Figure 6:
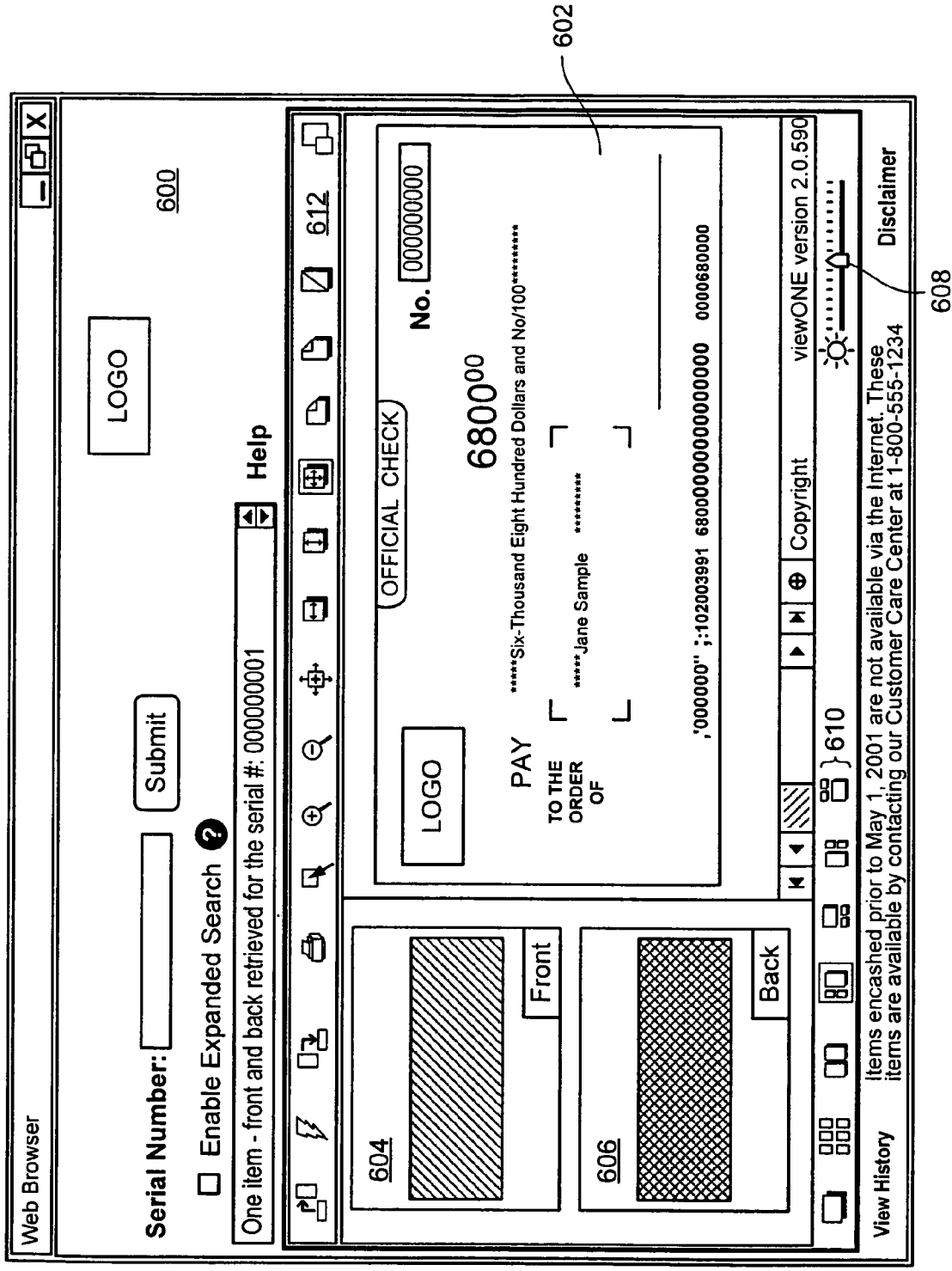
FIG. 6 illustrates a view screen for viewing an image of a negotiable instrument.

The view screen 600 of FIG. 6 provides an image 602 of a PUA instrument. By selecting either the front image 604 or the back image 606 the user may select which side of the instrument is displayed. A brightness control 608 allows the user to adjust the image's brightness. A display tool bar 610 allows the user to specify how the front, back and main images are displayed. A second tool bar 612 allows the user to perform other operation on the image such as magnifying it, rotating it, printing it, and the like. Using the image display screen, the user may obtain information necessary to process the PUA instrument.

Returning to FIG. 5, the PUA workbench screen 500 includes columns for client # 508, serial # 510, amount 512, type (either official check or money order in this example) 514, and paid date 516. Clicking the column header in each of these columns sorts the list according to the content of the column. Additionally, the screen 500 includes columns with radio buttons for issue 518, previously reported 520, serial # change 522, and reset 524. Selecting the issue all hyperlink 526 results in the selection of each radio button in the issue column 518, indicating that all the PUAs in the column should be issued. The client would then follow up by remitting funds to cover each of the instruments listed. For example, clients typically remit funds on a regular basis to cover any negotiable instruments issued by the client. If a negotiable instrument is presented to the backer for payment before the client is able to notify the backer of its issue and remit the funds, then the PUA may be resolved merely by the client remitting funds to cover the item in combination with selecting the radio button in the issue column relating to the item. Selecting the reset hyperlink 528 results in the selection of each radio button in the reset column 524, indicating that no disposition has been determined for the PUAs in the list.

Figure 7:
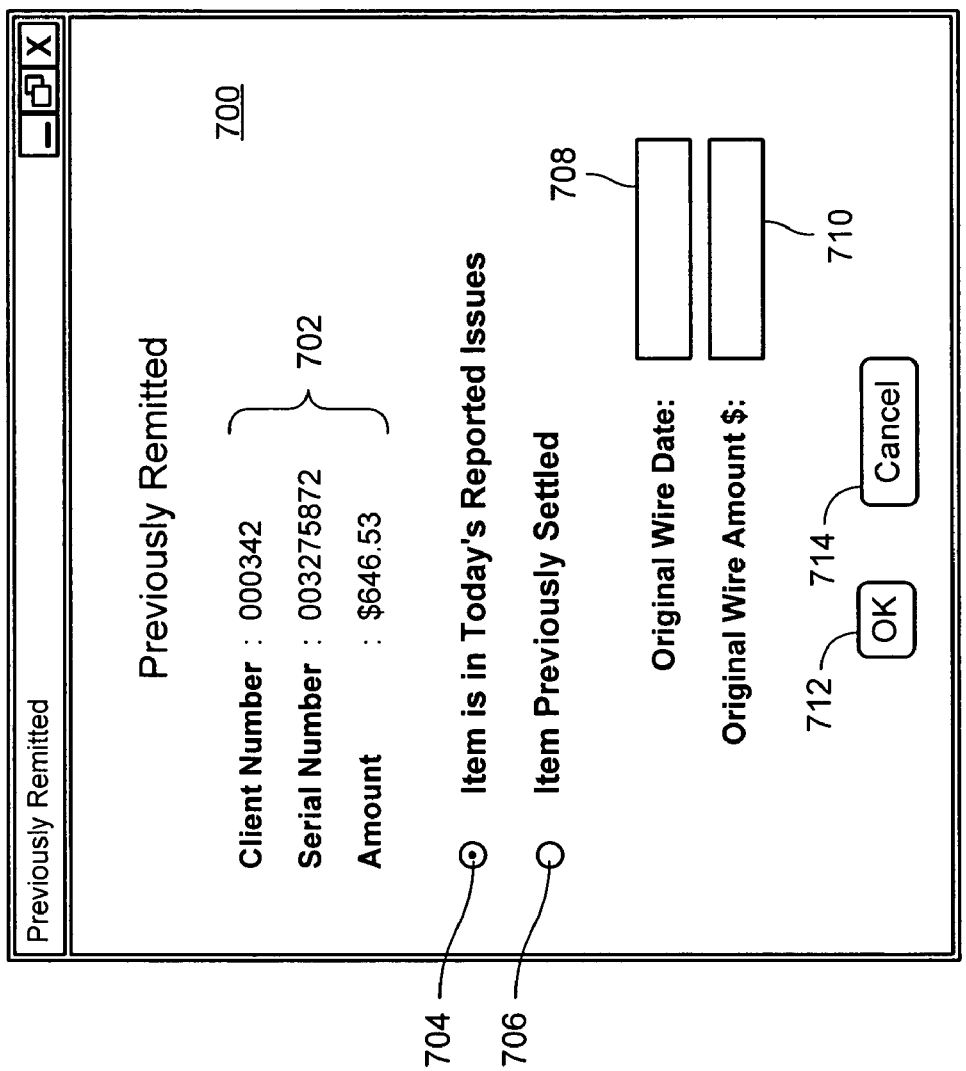
FIG. 7 illustrates a previously remitted dialog box according to embodiments of the present invention.

If the client previously reported an item listed as PUA, the user may select the radio button in the previously reported column 520 in the row relating to the item. Selection of one of these radio buttons results in the previously remitted dialog box 700 of FIG. 7 being displayed. The previously remitted dialog box includes an information area 702 summarizing information relating to the item. A radio button 704 is provided for indicating that the item is in a report for the current day. Another radio button 706 is provided for indicating that the item was reported on a previous day. If this radio button is selected, the user indicates the original wire date in the field 708, and the original wire amount in the field 710. Selecting the okay button 712 saves the information and closes the dialog box, while the cancel button 714 only closes the box.

Returning to FIG. 5, if the client previously reported the item but, for one reason or another, the serial number originally reported is incorrect, the client may select a radio button in the serial # change column 522 in the row relating to the item. Selecting one of these radio buttons results in the serial number change dialog box 800 being displayed. The serial number change dialog box 800 includes an information area 802 that summarizes information about the item. It also includes a field 804 for entering the original serial number. Selecting the okay button 806 saves the information and closes the dialog box, while the cancel button 808 only closes the box.

Returning to FIG. 5, once the user has worked the PUAs in the list, the user may submit the information to the backer by selecting the submit button 530, save the information without submitting it by selecting the save button 532, or cancel the information the user has entered by selecting the cancel button 534. If the check box 536 is selected when the user selects either the submit 530 or save 532 buttons, the user is presented with a list of additional PUAs, if any remain.

FIG. 9 illustrates a PUA view screen 900 that may be accessed by selecting the checkbox 402 to indicate that the PUAs should be displayed in the view mode. The display screen includes much of the same information as the PUA workbench screen 500. Additionally, the view screen 900 includes columns for reserved by 902, status 904, worked by 906, and wire date 908. The list may be sorted by selecting the hyperlink at the top of each column.

Figure 10:
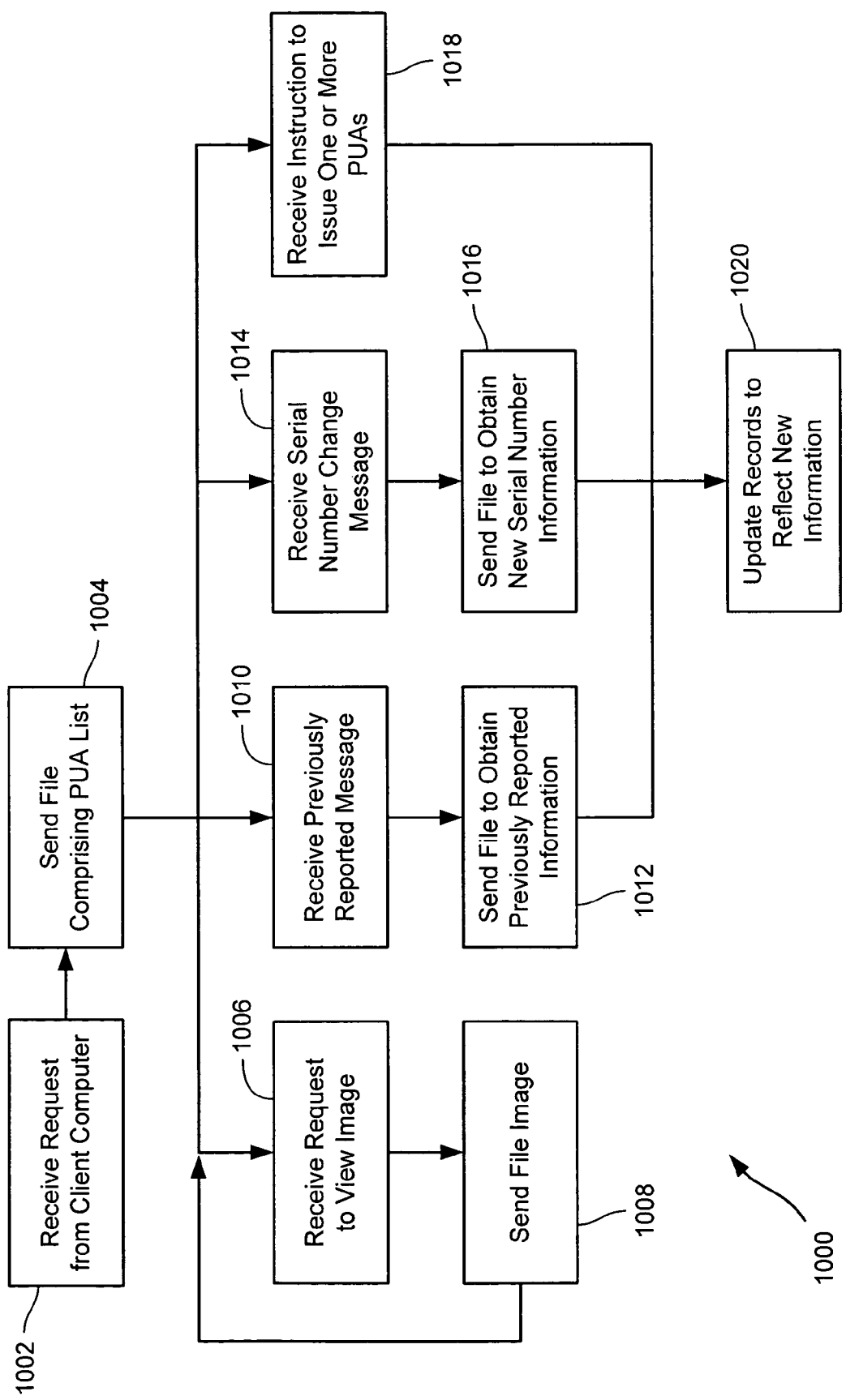
FIG. 10 illustrates a method of processing negotiable instruments that may be implemented in the system of FIG. 1.

Attention is directed to FIG. 10, which illustrates a method 1000 of processing negotiable instruments according to embodiments of the present invention. The method begins at block 1002 wherein a host computer system receives a request from a client computer to view a list of PUA instruments relating to the client. The client may request access to the information as a matter of course, for example, each banking day, or may request access to the information in response to a prompt from the backer that the client has PUAs to resolve. Other examples are possible.

At block 1004, the host computer system transmits a file comprising the client's list of PUAs. The file may take the form of a web page, such as the PUA workbench screen 500 of FIG. 5, as previously described. Transmission of the file may be preceded by security and authorization checks, as previously described and/or menu selections by the client. The file also may include interactive features that allow the client to provide information for resolving its PUAs directly into a web page that displays the list of items needing resolution.

At block 1006, the host computer system receives a request to view an image of a PUA item, in response to which the host computer system transmits an image file comprising the image of the item at block 1008.

At block 1010, the host computer system receives a message indicating that the client previously reported an item. In response, the host computer system sends, at block 1012 a file comprising data fields, such as the previously remitted dialog box 700 of FIG. 7. The data fields are configured to receive information from the client, such as the date that the client previously reported the item, and the amount of a wire transfer relating to the item.

Figure 8:
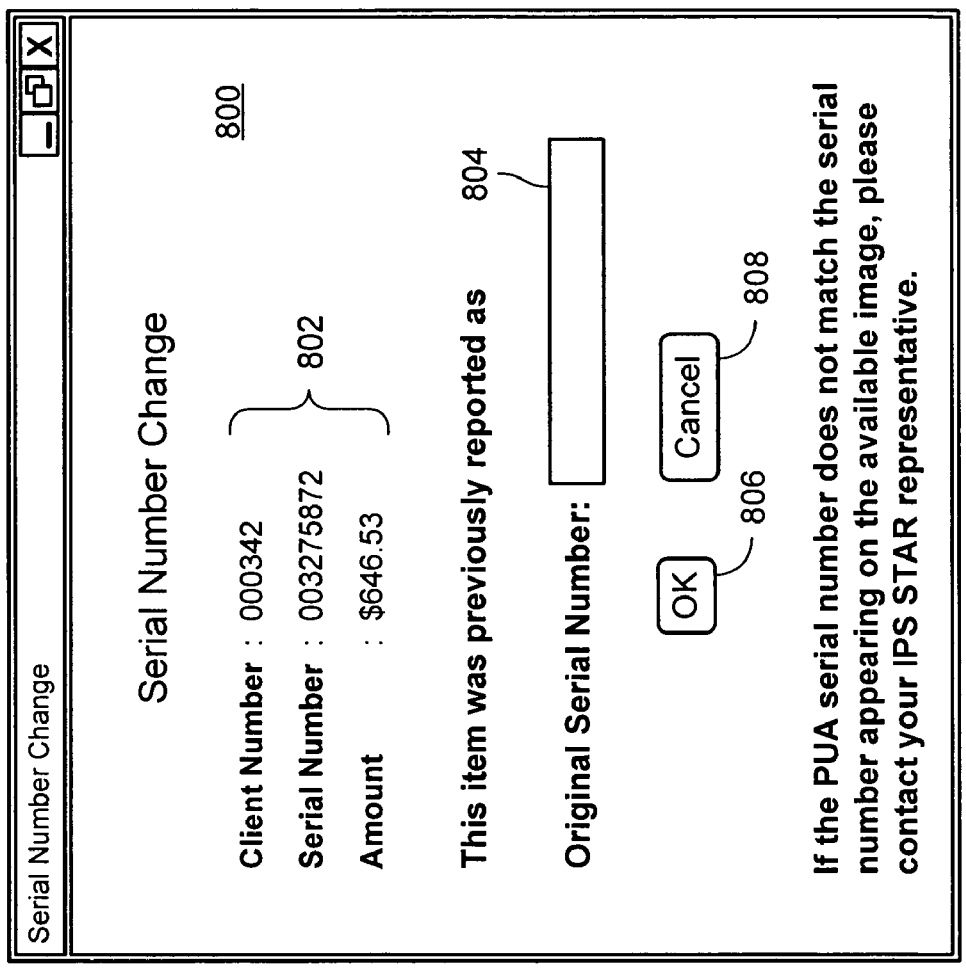
FIG. 8 illustrates a serial number change dialog box according to embodiments of the present invention.

At block 1014, the host computer system receives a message indicating that the serial number of an item should be changed. In response, the host computer sends, at block 1016, a file comprising data fields, such as the serial number change dialog box 800 of FIG. 8. The data fields are configured for receiving from the client updated serial number information.

At block 1018, the host computer system receives a message from the client that one or more of the items in the PUA list should be issued. At block 1020, the host computer system receives and saves information received from the client.

The method 1000 provides but one example of a method by which a backer of negotiable instruments may receive information from clients. Many other examples are possible and apparent to those having skill in the art in light of the disclosure herein. Further, the present invention may include other features for displaying and receiving information from clients relating to the issuance and processing of negotiable instruments. For example, the client may request reports of its negotiable instruments sorted in different ways. The client may request that a stop payment be placed on a negotiable instrument. The client also may provide information needed for posting adjustments to one or more negotiable instruments issued by the client. Many other examples are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to processing certified negotiable instruments. For example, the present invention may be used to process other forms of negotiable instruments and/or monetary representative items. Accordingly, the above description should not be taken as limiting the scope of the invention, which is defined in the following claims.

What is claimed is:

1. A method of processing negotiable instruments, comprising:

receiving a message at a host computer system of a processor that processes negotiable instruments from a client computer of an issuer that issues negotiable instruments, wherein the message comprises a request to receive a list of negotiable instruments paid by the processor and issued by the issuer;

transmitting a file from the host computer system to the client computer, the file comprising:

the list; and at least one selection arrangement for at least one item in the list, wherein the at least one selection arrangement is programmed to receive information from the issuer relating to issue information for the at least one item;

in response to a selection using one of the at least one selection arrangements, receiving at the host computer system issue information relating to one of the items, wherein the issue information relating to one of the items comprises a selection that indicates that the issuer previously reported the issue information to the processor;

transmitting from the host computer system to the client computer a file comprising selection arrangements programmed to receive additional issue information relating to the one of the items; and receiving the additional issue information at the host computer system, wherein receiving the additional issue information comprises receiving a date upon which the issuer previously reported the item and an amount relating to the item.

2. A method of processing negotiable instruments, comprising:

receiving a message at a host computer system of a processor that processes negotiable instruments from a client computer of an issuer that issues negotiable instruments, wherein the message comprises a request to receive a list of negotiable instruments paid by the processor and issued by the issuer;

transmitting a file from the host computer system to the client computer, the file comprising:
  the list; and
  at least one selection arrangement for at least one item in the list, wherein the at least one selection arrangement is programmed to receive information from the issuer relating to issue information for the at least one item;

in response to a selection using one of the at least one selection arrangements, receiving at the host computer system issue information relating to one of the items, wherein the issue information relating to one of the items comprises a selection that indicates that the issuer previously reported the issue information to the processor using a different serial number;

transmitting from the host computer system to the client computer a file comprising selection arrangements programmed to receive additional issue information relating to the one of the items; and receiving the additional issue information at the host computer system, wherein receiving the additional issue information at the host computer system comprises receiving the different serial number used to previously report the item.

3. A system for processing negotiable instruments, comprising:

a host computer system; and software that programs the host computer system to:
  receive from a client computer a request to receive a list of negotiable instruments paid by a processor and issued by a issuer;
  transmit a file from the host computer system to the client computer, wherein the file comprises:
    the list; and
    at least one selection arrangement for at least one item in the list, wherein the at least one selection arrangement is programmed to receive information from the issuer relating to issue information for the at least one item;
  receive at the host computer system issue information relating to one of the items, wherein the issue information relating to one of the items comprises a selection that indicates that the issuer previously reported the issue information to the processor using a different serial number;
  transmit from the host computer system to the client computer a file comprising selection arrangements programmed to receive additional issue information relating to the one of the items; and
  receive the additional issue information at the host computer system; and
  receive the different serial number used to previously report the item.

* * * * *